Patented Feb. 22, 1938

2,109,024

UNITED STATES PATENT OFFICE 2,190,024

PRODUCTION OF AZO DYESTUFFS

Karl Holzach, Carl Winter, and Bernd v. Bock, Ludwigshafen-on-the-Rhine, Germany, assignors to General Aniline Works, Inc., New York, N. Y., a corporation of Delaware No Drawing. Application March 21, 1935, Serial No. 12,328. In Germany March 22, 1934

5 Claims. (Cl. 260—96)

The present invention relates to new azo dyestuffs and a process of producing same.

We have found that valuable azo dyestuffs are obtained by coupling diazo compounds of aromatic amines containing no sulfonic or carboxylic acid groups with (N-aryl-)-amino-carboxylic acid nitriles free from sulfonic and carboxylic acid groups and having the general formula:

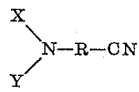

in which R is a methylene group or a chain of methylene groups of which the hydrogen atoms may be replaced by alkyl, aryl or aralkyl groups, X is a hydrogen atom or an alkyl, hydroxyalkyl, aryl or aralkyl group, as for example a methyl, ethyl, hydroxyethyl, phenyl or benzyl group, and Y is an aryl group, as for example a phenyl, methylphenyl or naphthyl group, which may also be substituted but which must not contain sulfonic acid or carboxylic acid groups. Compounds of the said kind are for example (N-phenyl)-amino-acetonitrile, (N-phenyl)-alpha-amino-alpha-phenylacetonitrile, (N-hydroxyethyl-N-phenyl)-amino-acetonitrile, (N-phenyl)-beta-amino-propionic acid nitrile, (N-diphenyl)-beta-amino-propionic acid nitrile, (N-phenyl)-alpha-amino-butyric acid nitrile, (N-phenyl)-gamma-amino-butyric acid nitrile, (N-ethyl-N-phenyl)-beta-amino-propionic acid nitrile, (N-ethyl-N-(meta-methyl)-phenyl)-beta-amino-propionic acid nitrile, (N-alpha-naphthyl)-beta-amino-propionic acid nitrile and (N-phenyl)-alpha-amino-caprylic acid nitrile. A great variety of aromatic amines capable of being diazotized and free from sulfonic acid and carboxylic acid groups may be employed as diazo components, as for example aniline, para-nitraniline, ortho-toluidine, 1-hydroxy-2-amino-5-nitrobenzene and alpha-naphthylamine, and also monoazo dyestuffs which are capable of being diazotized, as for example para-amino-azobenzene or para'-nitro-para-amino-azo-benzene.

The azo dyestuffs obtainable in the said manner are eminently suitable for dyeing cellulose esters and ethers and for the preparation of colored varnishes, spirit or nitrocellulose lacquers and for coloring stearin, paraffin wax, fats and oils.

The following examples will further illustrate how the said invention may be carried out in practice but the invention is not restricted to these examples. The parts are by weight.

Example 1

138 parts of para-nitraniline are diazotized and coupled with a solution of 150 parts of (N-phenyl)-beta-amino-propionic acid nitrile in 250 parts of concentrated hydrochloric acid and 2000 parts of water while adding sodium acetate until the solution is no longer mineral acid. The coupling is complete after a short time. The resulting dyestuff dyes acetate silk powerful yellow-orange shades. Spirit and nitrocellulose lacquers colored with the dyestuff yield golden yellow coatings.

When employing 190 parts of (N-ethyl-N-(meta-methyl)-phenyl)-beta-amino-propionic acid nitrile or 200 parts of (N-alpha-naphthyl)-beta-amino-propionic acid nitrile as coupling components, dyestuffs are obtained which dye acetate silk brilliant yellow-red and red-violet shades respectively.

Example 2

173 parts of 1-amino-2-chlor-4-nitrobenzene are diazotized and coupled with 180 parts of (N-ethyl-N-phenyl)-beta-amino-propionic acid nitrile in the manner described in Example 1. The dyestuff obtained dyes acetate silk very clear, brilliant scarlet red shades. Spirit and nitrocellulose lacquers which have been colored with the dyestuff yield clear red coatings. Stearin and paraffin wax are colored yellow-red by the dyestuff.

Example 3

138 parts of para-nitraniline are diazotized and the diazo solution is coupled with 140 parts of (N-phenyl)-amino-aceto-nitrile in the manner described in Example 1. The dyestuff thus obtained dyes acetate silk yellow-orange shades. Spirit and nitrocellulose lacquers may be colored in the same way as in Example 1. If the said coupling component is replaced by 190 parts of (N-hydroxyethyl-N-(meta-methyl)-phenyl)- amino-acetonitrile, a dyestuff is obtained which dies acetate silk powerful, brilliant red shades.

*Example 4*

197 parts of para-amino-azo-benzene are diazotized and coupled with a solution of 190 parts of (N-ethyl-N-phenyl)-beta-amino-propionic acid nitrile in 110 parts of 35 per cent hydrochloric acid and 1000 parts of water while adding 400 parts of sodium acetate. The dyestuff obtained dyes acetyl cellulose red-orange shades.

*Example 5*

154 parts of 5-nitro-2-aminophenol are suspended in 6000 parts of water, 125 parts of 35 per cent hydrochloric acid are added, diazotization effected by means of a solution of 300 parts of 23 per cent sodium nitrite solution and the resulting diazo solution coupled with a solution of 200 parts of (N-ethyl-N-(meta-methyl)-phenyl)-beta-amino-propionic acid nitrile in 1000 parts of approximately 4 per cent hydrochloric acid with an addition of about 500 parts of sodium acetate. The resulting dyestuff dyes acetate silk powerful rose-red shades.

What we claim is:—

1. Azo dyestuffs corresponding to the general formula

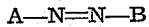

in which A stands for a radicle of the benzene series having a nitro group in para-position to the azo group the radicle being free from sulfonic and carboxylic acid groups, and B stands for the radicle of a compound free from sulfonic and carboxylic acid groups and corresponding to the general formula

in which R stands for at least one methylene group, $R_1$ is a member of the group consisting of hydrogen, akyl, aryl, and aralkyl groups, $n$ is any whole number, X stands for a member of the group consisting of hydrogen, an alkyl, hydroxy-alkyl, aryl, and aralkyl group, and Y stands for an aryl group, capable of coupling in para-position to the nitrogen atom attached to X and Y.

2. The azo dyestuff corresponding to the formula

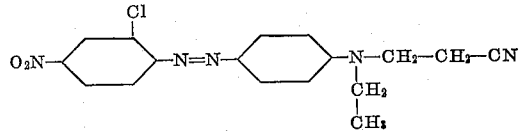

3. The azo dyestuff corresponding to the formula

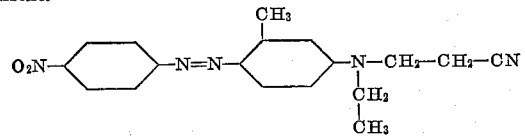

4. The azo dyestuff corresponding to the formula

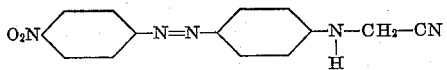

5. Azo dyestuffs corresponding to the general formula:

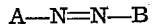

in which A stands for a radical of the benzene series having a nitro group in para-position to the azo group, the radical being free from sulfonic and carboxylic acid groups, and B stands for the radical of a compound free from sulfonic and carboxylic acid groups and corresponding to the general formula:

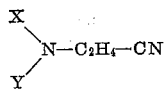

in which X stands for a member of the group consisting of hydrogen, an arkyl, hydroxy-alkyl aryl, and aralkyl group and Y stands for an aryl group capable of coupling in para-position to the nitrogen atom attached to X and Y.

KARL HOLZACH.
CARL WINTER.
BERND v. BOCK.